US006118234A

United States Patent [19]

Marcellus et al.

[11] Patent Number: 6,118,234

[45] Date of Patent: Sep. 12, 2000

[54] METHOD AND APPARATUS FOR EFFECTING DYNAMIC BRAKING OF A DIRECT CURRENT MOTOR

[75] Inventors: Michael T. Marcellus, Aurora; Anthony J. Novelle, Wood Dale; G. Scott Grafer, Huntley, all of Ill.

[73] Assignee: Eaton Corporation, Cleveland, Ohio

[21] Appl. No.: 09/226,840

[22] Filed: Jan. 7, 1999

[51] Int. Cl.[7] H02P 1/54

[52] U.S. Cl. 318/63; 318/53; 318/34; 318/362; 318/375; 318/543; 318/549; 318/757; 318/759; 200/553; 200/561; 200/562; 200/563

[58] Field of Search 318/63, 53, 34, 318/375, 362, 549, 543, 759, 757; 200/561, 563, 562, 553

[56] References Cited

U.S. PATENT DOCUMENTS

| | | | |
|---|---|---|---|
| 1,806,777 | 5/1931 | Wiley . | |
| 2,380,270 | 7/1945 | Suhr et al. | 172/279 |
| 3,501,607 | 3/1970 | Tanaka | 200/153 |
| 3,562,462 | 2/1971 | Long | 200/153 |
| 3,591,747 | 7/1971 | Dennison | 200/153 |
| 4,176,261 | 11/1979 | Epple | 200/1 V |
| 4,689,450 | 8/1987 | Sawada | 200/6 R |
| 4,947,008 | 8/1990 | Sato et al. | 200/6 R |
| 5,349,148 | 9/1994 | Hung | 200/562 |
| 5,735,392 | 4/1998 | Shirasaka | 200/553 |

*Primary Examiner*—Paul Ip
*Assistant Examiner*—Edgardo San Martin
*Attorney, Agent, or Firm*—Roger A. Johnston

[57] ABSTRACT

A double pole, double throw switching arrangement for effecting dynamic rotor braking of user controlled operation of a reversible direct current servo motor. Two columns of stationary center and oppositely disposed side contacts are disposed in spaced parallel arrangement on the switch base. One side contact in one column is connected to the opposite side contact in the other column and to the B+ supply. The remaining side contacts in each column are connected to a ground strap having a portion disposed for wiping contact. A pair of commonly user actuated moveable contact members are disposed for sliding contact with each column of contacts. The center contact in each column is connected to one end of a separate forward and reverse motor coil. In the neutral position both motor coil contacts are grounded. User movement of the common actuator in one direction simultaneously causes the moveable contact members to keep one motor coil grounded and connect the other motor coil to B+. User movement of the common actuator in an opposite direction simultaneously causes the moveable contact members to ground the other motor coil and connect the one coil to B+. Upon user release, the actuator returns to the neutral position, grounding both motor coils.

5 Claims, 5 Drawing Sheets

METHOD AND APPARATUS FOR EFFECTING DYNAMIC BRAKING OF A DIRECT CURRENT MOTOR

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

In the operation of direct current motors for servo actuators, it is desirable and even necessary in certain applications to eliminate or prevent continued rotation of the motor rotor after power to the motor has been switched off. This function has been found particularly necessary in low voltage servo motor applications as, for example, those found in certain automotive accessory applications such as power-operated windows, power seats and pedal adjustment mechanisms.

In order to effect dynamic braking of a direct current motor rotor, it has been found necessary to find a way or means of using the counter EMF of the rotating motor magnets after the current supply to the stator coil is cut to provide braking of the continued rotation of the motor rotor.

Heretofore, dynamic braking of a servo motor has been accomplished by the use of two independent single pole, double throw switches with the normally closed contacts of both switches connected to the negative or ground side of a direct current servo motor circuit, with the normally open contacts connected to the B+ supply voltage by having each common pole connected to a motor terminal. When the switch is actuated for servo motor rotation in one direction, one of the switches changes state while the other switch mechanism remains unchanged. For reverse servo motor rotation, the other of the two switch mechanisms is actuated while the one or first switch mechanism remains unchanged. Thus, the switching arrangements of the prior art for dynamic braking of a user control reversibly operated direct current servo motor required independent actuation of one or the other of two separate independent switching mechanisms.

Referring to FIGS. 6 and 7, the prior art switching arrangement for dynamic braking of direct current servo motors is shown wherein a single pole, double throw switch assembly indicated generally at 1 has a normally closed contact 2, a normally open contact 3 connected to the B+ supply and a common contact blade 4 connected to one motor coil terminal. A normally closed contact 2 is grounded and the switch is actuated by user operated plunger 5. It will be understood that two of the switch arrangements denoted by reference numeral 1 are required for forward and reverse operation of the servo motor.

Referring to FIG. 7 the switch 1 is shown connected to one motor coil 6 through the common terminal; and, a second identical switch 1' is connected through its common terminal to a second motor coil disposed to effect opposite direction motor rotation from coil 6. The stationary normally closed contact 2 for switch 1 is grounded as is the normally closed contact 2' of switch 1'. Upon movement of the plunger 5 in one direction switch 1 is actuated to energize coil 6; and, whereas movement of the second actuator 5' must be effected to cause energization of coil 7 for reverse motor operation. Thus the switching arrangement of the prior art requires two individual single pole, double throw switches which requires additional components and results in relatively higher cost installations, particularly for motor vehicle window lift motor controls.

BRIEF SUMMARY OF THE INVENTION

The present invention provides for the instantaneous grounding of the stator coils of a direct current motor when power to the coils is cut off by the user movement of the motor control switch. The grounding is provided by a separate set of contacts which connect the motor coil contacts of the switch to the grounding contacts after the power from the B+ contacts has been broken. Thus continued rotation of the rotor magnets generates a current flow in the motor coil circuit which counters the magnetic poles of the rotor magnets and provides a retarding torque to stop rotation of the motor rotor.

The present invention thus utilizes a double pole, double throw switch mechanism which enables the user to reversibly control a direct current servo motor by opposite actuation of a single switch actuator and yet provides grounding of the motor coils to provide dynamic braking. The present invention thus provides dynamic braking of a reversibly operated direct current servo motor in a manner which reduces the number of switch actuating mechanisms thereby eliminating a number of components and provides a lower cost and more compact switch design.

DETAILED DESCRIPTION OF THE INVENTION

Figure 1:
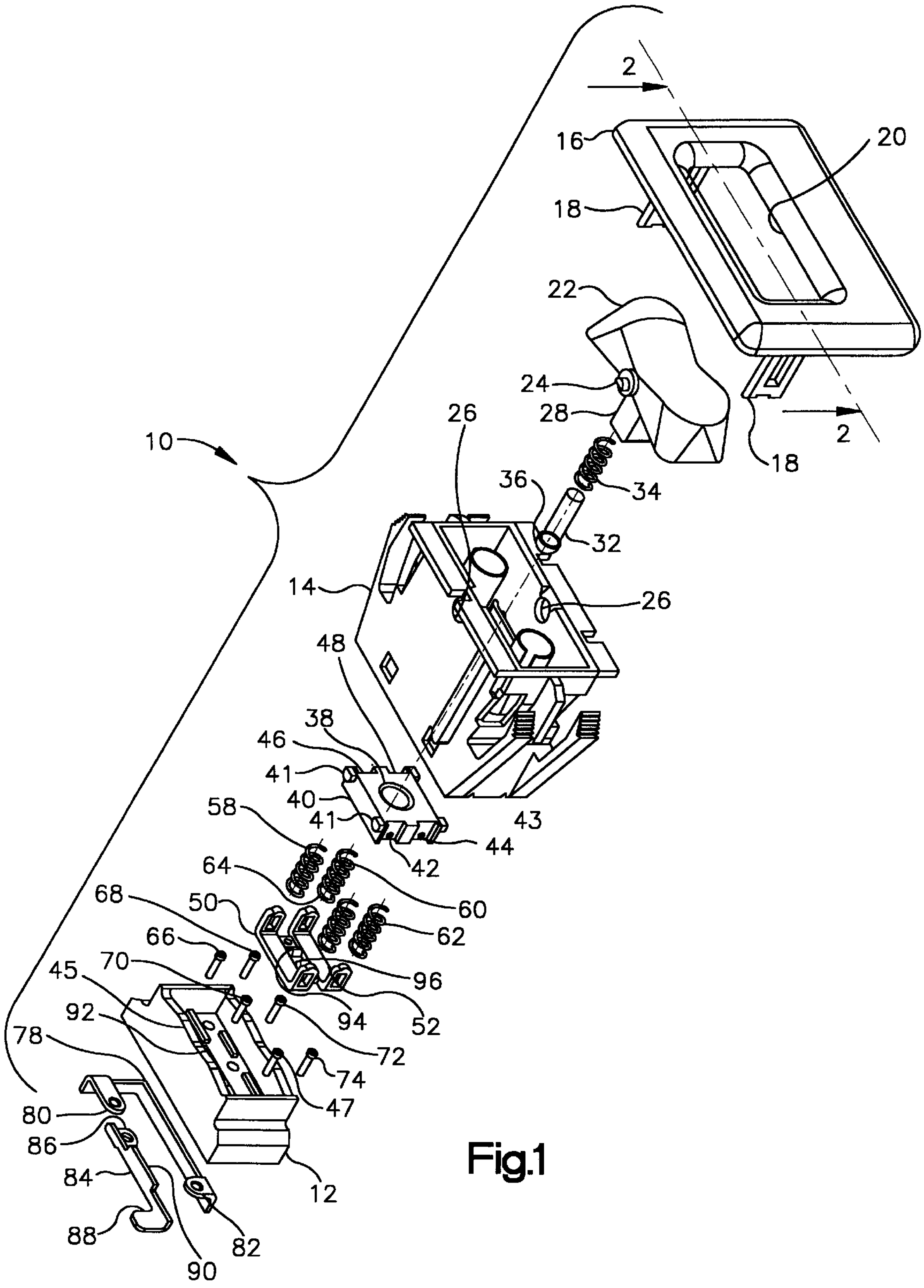
FIG. 1 is an exploded view of the switch assembly of the present invention.
Figure 2:
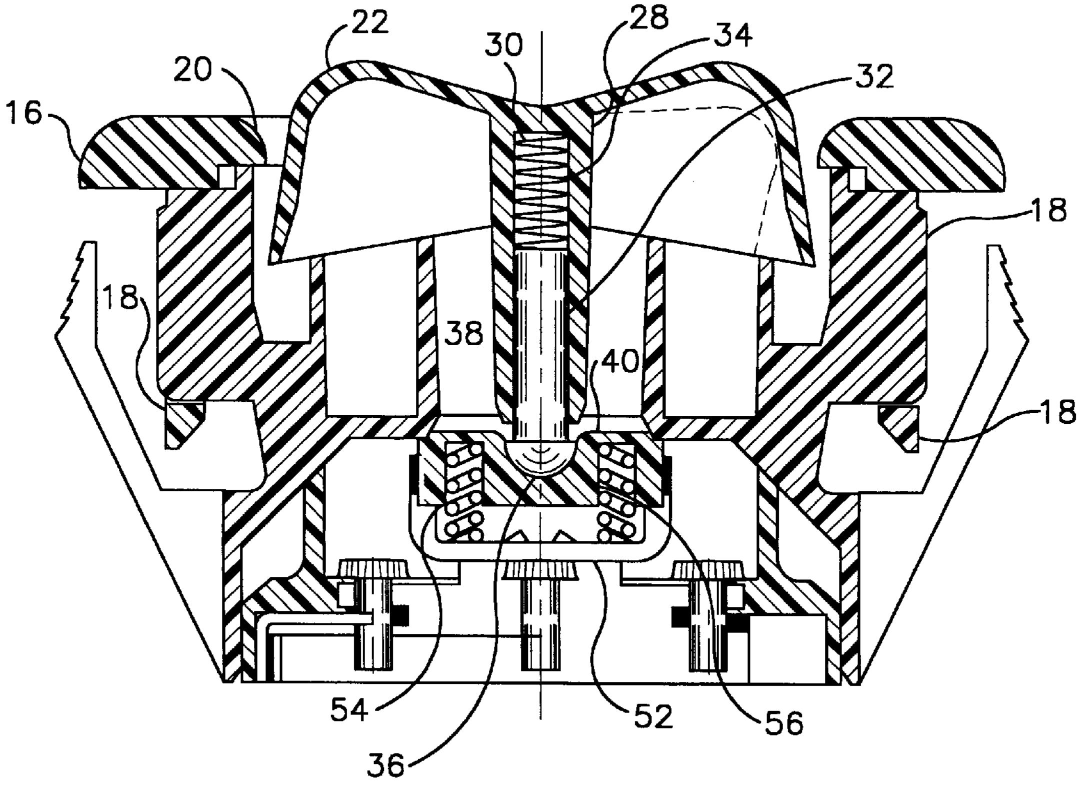
FIG. 2 is a cross-section taken along section-indicating lines 2—2 of FIG. 1.

Referring to FIGS. 1 and 2, the switch assembly of the present invention is indicated generally at 10 and has a base 12 which contains the stationary switch contacts as will be hereinafter described in greater detail and a housing or cover 14 received over and secured to the base 12. A flanged bezel member 16 is provided and is preferably engaged with the housing 14 by snap locking tabs 18 and has an aperture 20 formed therein through which a switch actuator extends.

A rocker-type actuator 22 has oppositely extending trunnions, one of which is illustrated and denoted by reference numeral 24, which extend in opposite directions from the rocker 22. Each of the trunnions 24 engages respectively an aperture 26 formed on opposite sides of the housing 14. Thus, the user may manually contact the surface of rocker 22 through the flange aperture 20 and effect pivotal movement of the rocker about the trunnions 24.

Rocker 22 has a downwardly extending portion 28 which has a bore 30 formed therein into which is slidably received a plunger 32 which is biased downwardly by spring 34. The lower end of plunger 32 has a button with a preferably hemispherical surface 36 formed thereon which engages a correspondingly configured concave recess 38 formed in a slider block 40.

Figure 3B:
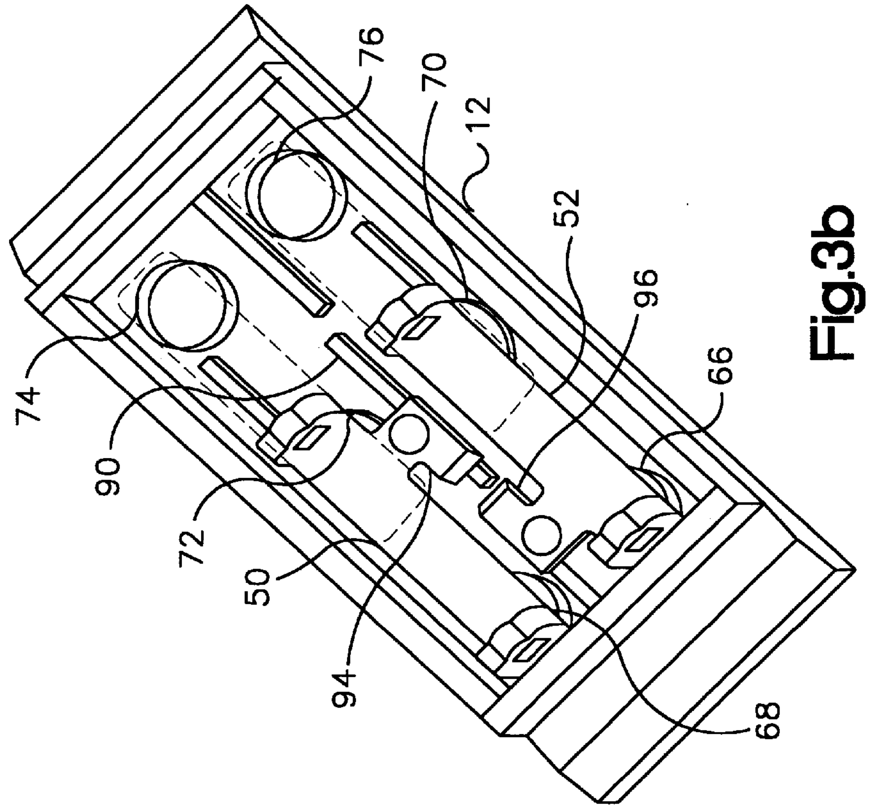
FIG. 3*b* is a view similar to FIG. 3*a* showing the moveable contacts in the actuated position.
Figure 3A:
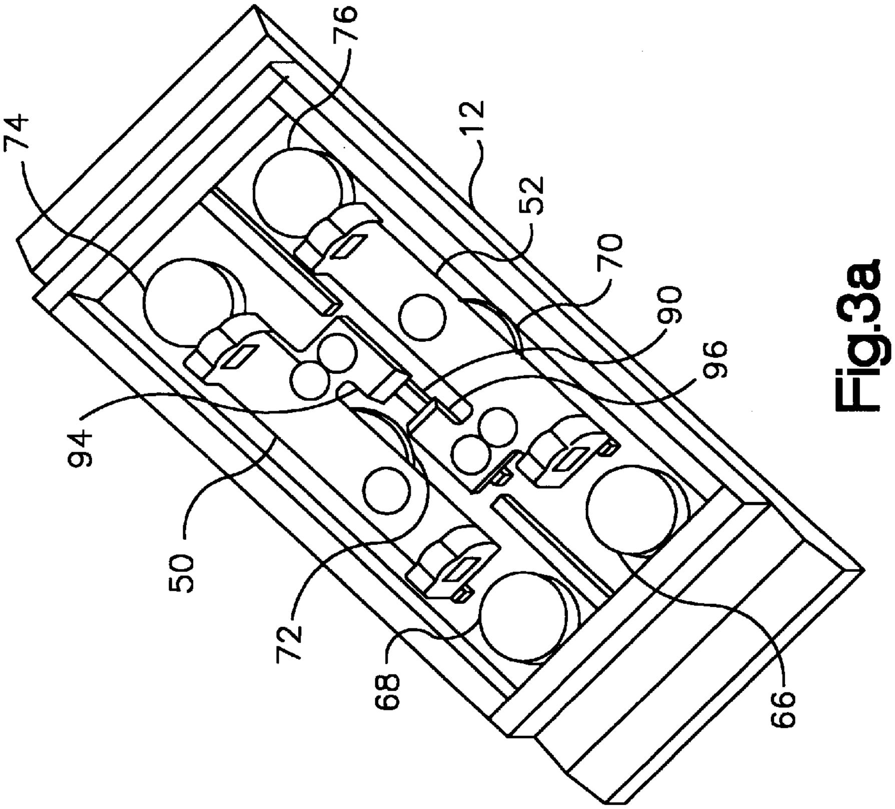
FIG. 3*a* is a perspective view of the base with the contacts assembled therein in the neutral position.

The block 40 has a pair of spaced parallel grooves 42, 44 and 46, 48 formed in the opposite ends thereof into each of which is received an end of a pair of sliding contact members 50, 52 which ends are bent upward to form a generally U-shaped configuration as shown in FIGS. 1, 3*a* and 3*b*.

The block 40 has a plurality of cavities or bores formed in the undersurface thereof, two of which are visible in FIG. 2 and denoted by reference numerals 54, 56, into which is received the upper end of one of a plurality of bias springs 58, 60, 62. 64. The lower ends of the bias springs 58, 60, 62, 64 are registered against the upper surface of the contact members 50, 52 and urge the contact members in a downward direction.

Block 40 also has a pair of detent projections 41, 43 formed on cash side thereof, which projections engage respectively detent tracks 45, 47 formed on the base for detenting the block in the desired position.

Figure 4:
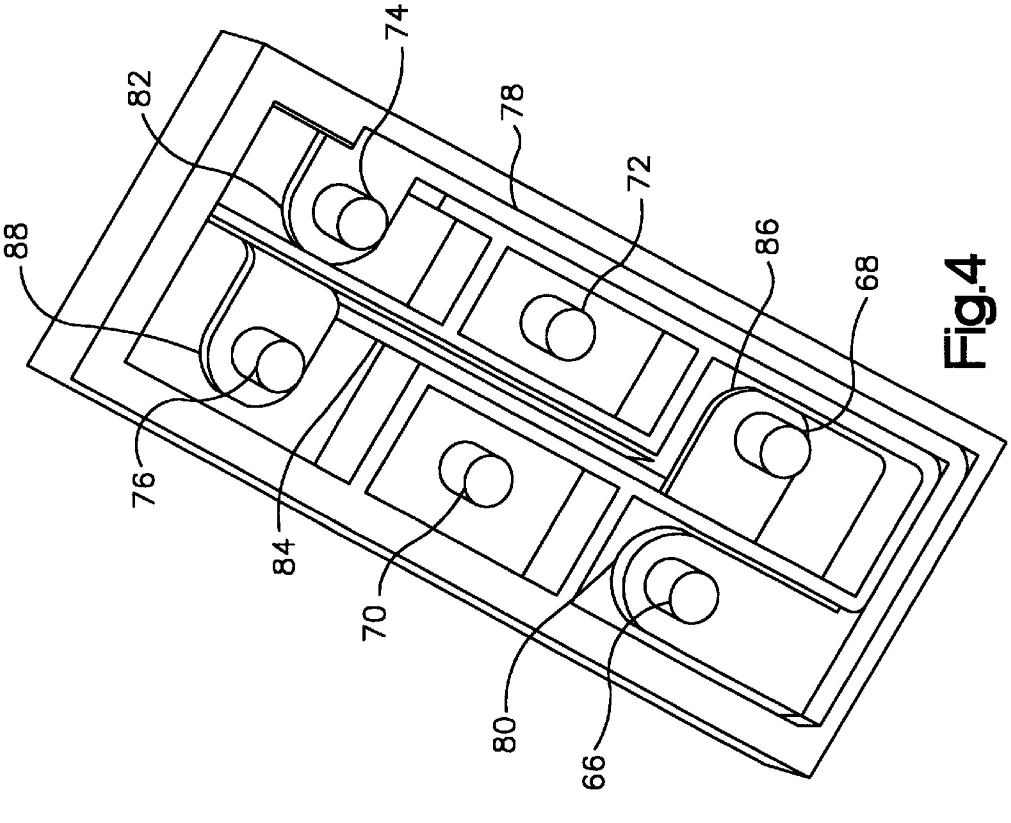
FIG. 4 is a perspective view of the underside of the base and contact assembly of FIGS. 3*a* and 3*b;*
Figure 6:
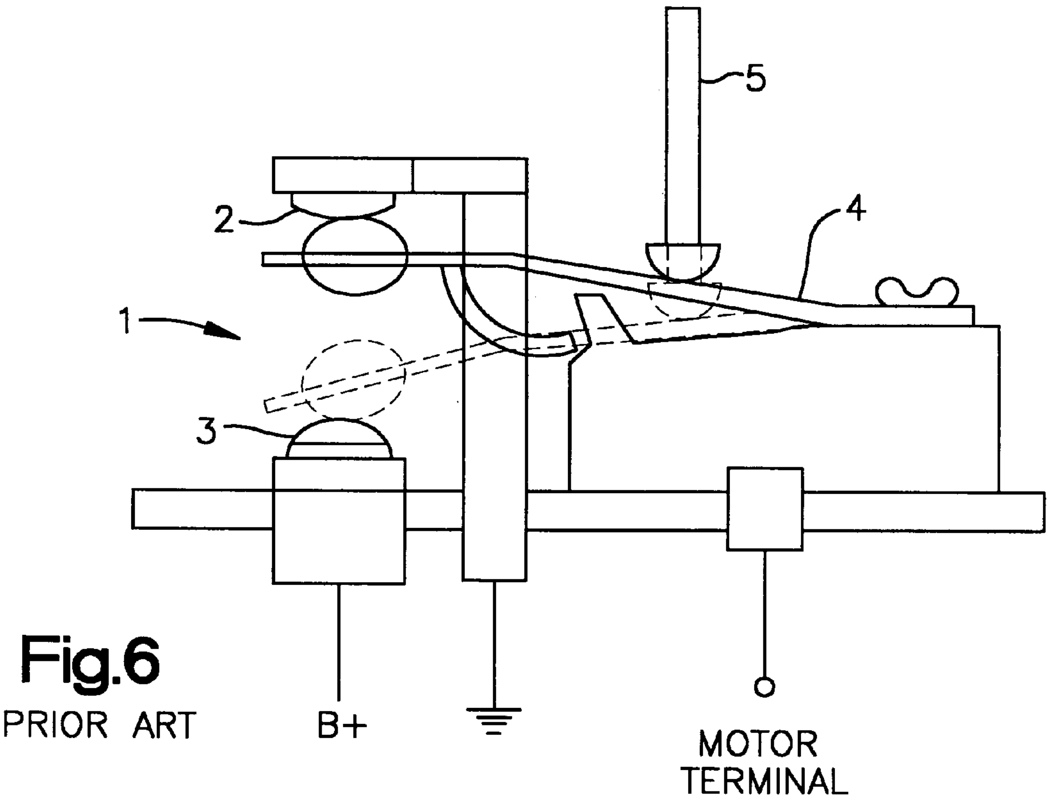
Fig.6 PRIOR ART
FIG. 6 is a pictorial diagram of one of the SPDT switches employed in the prior art; and, FIG. 7 is a circuit schematic for the switching arrangement of the prior art.
Figure 7:
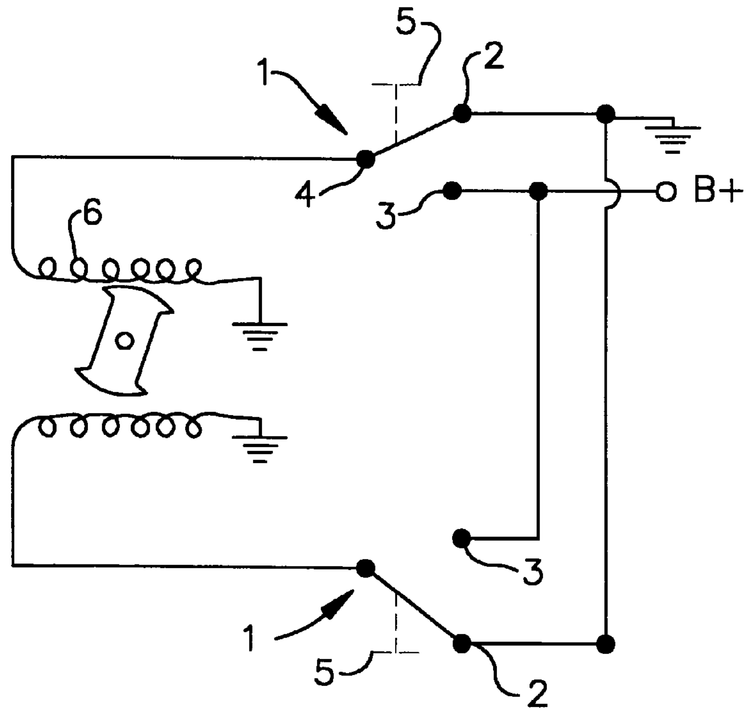
Fig.7 PRIOR ART

Referring to FIGS. 1 through 4, base 12 has three pairs of spaced electrical contacts denoted by reference numerals 66 through 76 disposed thereon with portions thereof extending downwardly through apertures provided in the base 12 and project beyond the undersurface of base 12 as shown in FIG. 4. The contacts are arranged in two columns with contacts 68, 72, 74 aligned in spaced relationship and contacts 66, 70, 76 aligned in spaced relationship with the two columns spaced from each other in preferably side-by-side parallel arrangement.

Referring to FIGS. 1 and 4, contacts 66 and 74 are interconnected by a terminal strip 78 which has an aperture tab 80, 82, formed at each end thereof with the tab 80 received over contact 66 and tab 82 received over contact 74. In the present practice of the invention, the tabs may be press-fitted or riveted over the shanks of the contacts.

A grounding strap or terminal 84 has an aperture tab 86, 88 formed on each of the opposite ends thereof with tab 86 received over contact 68 and tab 82 received over contact 76 thus interconnecting these latter two contacts. Strap 84 has a raised rib portion 90 formed centrally thereon which extends upwardly through a slot 92 formed in base 12 such that the upper surface of the rib 90 projects upwardly from the bottom of base 12 as shown in FIGS. 3*a* and 3*b* and forms an electrical contact surface.

Each of the sliding contact members 50, 52 has a transversely extend generally L-shaped wiper portion denoted respectively by reference numerals 94, 96 extending from the side thereof which are disposed to wipe against the contact surface 90 of the ground strap 84 upon movement of members 50, 52.

Figure 5:
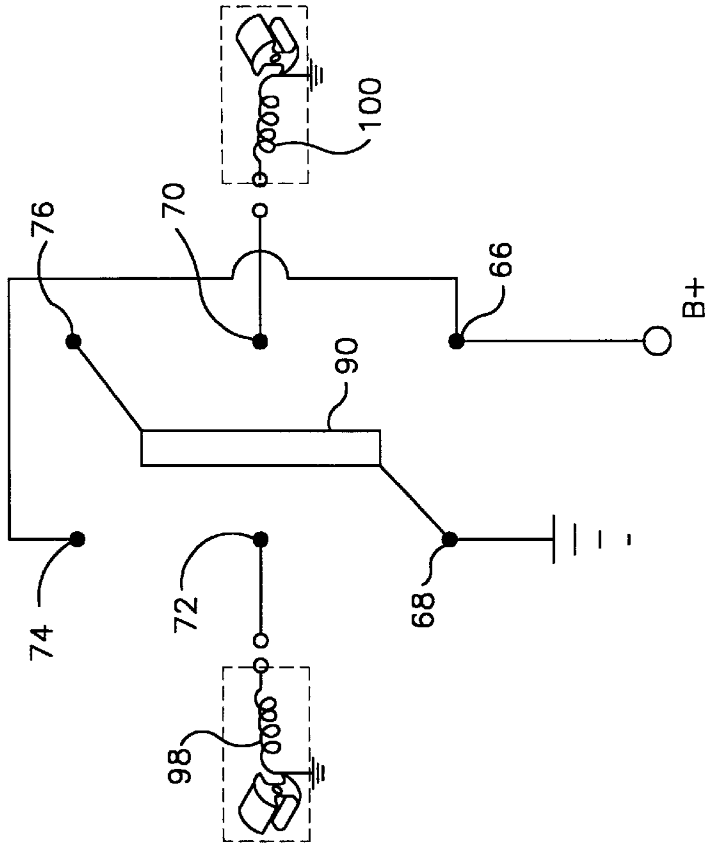
FIG. 5 is a circuit schematic of the switch as connected to the forward and reverse coils of a direct current motor.

Referring to FIGS. 3*a*, 3*b* and 5, user movement of the rocker 22 causes the slider block 40 to move lighting contacts 50, 52 simultaneously in either of two opposite directions for effecting switching between the various contacts on the base. Referring to FIG. 3*a*, the contact members 50, 52 are shown in the neutral position with the rocker 22 positioned as indicated in FIG. 2. In the position of FIG. 3*a*, the wiper 94 on contact member 50 engages the ground strap surface 90; and, wiper 96 on sliding contact 52 engages ground strap surface 90 also. The wipers in the position shown on FIG. 3*a* do not engage either of the side contact pairs 66, 68 or 74, 76.

With reference to FIG. 3*a*, center contact 70 is connected to the ground contact 90 by sliding contact 52; and, center terminal 72 is connected to the ground terminal 90 by wiper 94 on sliding contact member 50.

Referring to FIGS. 2 and 3*b*, when the user has actuated rocker 22 in a clockwise rotation to the position shown in dashed outline in FIG. 2, sliding contacts 50, 52 have been moved to the position shown in FIG. 3*b* wherein central contact 70 and end contact 66 are interconnected by contact member 52; and, terminals 68, 72 are both in contact with member 50 and are connected to ground terminal 90 by the wiper 94 of sliding contact member 50. It will be understood that if the user rotates the rocker in a counterclockwise direction from the position shown in FIG. 2, contact members 50, 52 will be moved to the position shown in dashed outline in FIG. 3*b*. In the dashed outline position of FIG. 3*b*, contact member connects motor coil contact 72 to the B+ supply contact 74; and, contact member opens B+ contact 66 and connects motor coil contact 70 to ground through contacts 76 and 90.

Referring to FIG. 5, central contacts 70, 72 are each connected to one end of a separate direct current motor coil 98, 100 for respectively providing opposite direction rotation of a motor. With the switch contacts 50, 52 in the position shown in FIG. 3*b*, the motor coil 100 is connected to the source of B+ power through contact 66 and contact 76; and, motor coil 98 is shorted to ground at both ends via contact 68 and contact member 50 connected to ground strap surface 90. It will be understood that if the rocker actuator 22 is rotated in the opposite direction so as to move contact members 50, 52 to a position interconnecting contact 76 with ground strap surface 90 via wiper 96 and to connect B+ contact 74 to the opposite motor coil contact 72, motor coil 98 is energized and motor coil 100 is grounded at both ends. Thus, the present switch provides for a single user operated actuator to simultaneously ground both ends of opposite rotation motor coils in the neutral position and to simultaneously ground one coil and energize the other in one actuated position and to energize the one coil and ground the other in the opposite actuator position. The present invention thus provides a low cost and simple solution to the problem of providing dynamic braking of a direct current servo actuator motor intended for opposite direction rotation and is particularly suitable for control of motor vehicle power window servo motors.

Although the invention has hereinabove been described with respect to the illustrated embodiments, it will be understood that the invention is capable of modification and variation and is limited only by the following claims.

What is claimed is:

1. In combination a switch assembly for dynamic braking of a direct current motor having a stator coil and a rotor with magnetic poles comprising:

(a) a base having a first pair of electrical contacts disposed thereon in spaced arrangement, with each of said first pair of contacts connected to an opposite end of said motor stator coil;

(b) a second pair of contacts disposed in spaced arrangement on said base and in spaced arrangement on one side with respect to said first pair of contacts with one of said second pair connected to ground and the other of said second pair connected to a B+ supply voltage;

(c) a third pair of contacts disposed in spaced arrangement on a side opposite said one side with respect to said first pair of contacts, with one of said third pair of contacts connected to ground and the other of said third pair connected to said second pair B+ contact;

(d) an auxiliary contact disposed on said base intermediate said first pair of contacts, said auxiliary contact connected to said ground contacts of said first and third pairs of contacts; and, (e) a first and a second sliding contact commonly moveable between a (i) neutral position wherein said first sliding contact connects one of said first pair of contacts to said auxiliary contact and said second sliding contact connects the other of said first pair of contacts to said auxiliary contact, wherein both ends of said motor coil are grounded, (ii) a first operating position wherein said first sliding contact connects one of said first pair of contacts to said auxiliary contact and said second sliding contact connects the other of said first set of contacts to the B+ contact of said third pair of contacts for effecting motor coil excitation in one direction, (iii) a second operating position, wherein said first sliding contact connects said one of said first pair of contacts to said B+ contact of said second pair of contacts and said second sliding contact connects the other of said first pair of contacts to said auxiliary contact for effecting excitation of said motor coil in a direction opposite said one direction; and, (f) actuator means operable upon user movement to move said first and second sliding contacts between said neutral position and said first and second operating positions.

2. The assembly defined in claim 1, wherein said first sliding contact is in continuous electrical connection with one of said first pair of contacts and said second sliding contact is in continuous electrical connection with the other of said first pair of contacts.

3. The assembly defined in claim 1, wherein said actuator means includes a rocker type actuator member.

4. A method of dynamic braking a direct current motor having a stator coil and rotor with oppositely directed magnetic poles comprising:

(a) disposing a first pair of motor contacts on a switch base and connecting one of said pair of contacts to an opposite end of said motor stator coil and connecting the other of said pair to the opposite coil end;

(b) disposing a second pair of contacts on the base on one side of said first pair and connecting one of said second pair to a B+ source of voltage;

(c) disposing a third pair of contacts on the side of said first pair opposite said second pair and connecting one of said third pair to said B+ contact of said second pair;

(d) disposing an auxiliary contact intermediate said first pair of contacts and connecting the other of said second pair and third pair of contacts to said auxiliary contact, and connecting said auxiliary contact to ground;

(e) disposing a pair of sliding contacts on said base in a neutral position connecting both of said first pair of contacts to said auxiliary contacts and grounding said coil at both ends and moving said sliding contacts to a side position connecting the B+ contact of one of said first and third pairs to one of said first contact pairs and connecting the other of said first pair of contacts to ground and operating said motor in one direction of rotation; and, (f) commonly moving said sliding contacts from said side position to said neutral position to stop said current flow in said coil and dynamically braking the motor rotor from continued rotation after current cut-off to the stator coil.

5. The method defined in claim 4, wherein said step of moving said sliding contacts includes engaging said contacts with a pivoted rocker and applying an actuation force to said rocker and pivoting said rocker.

* * * * *